(12) United States Patent
Kim et al.

(10) Patent No.: US 12,492,849 B2
(45) Date of Patent: Dec. 9, 2025

(54) AIR CONDITIONER AND METHOD FOR CONTROLLING SAME

(71) Applicant: LG ELECTRONICS INC., Seoul (KR)

(72) Inventors: Beomchan Kim, Seoul (KR); Sungoh Choi, Seoul (KR); Hyeri Park, Seoul (KR); Jusu Kim, Seoul (KR); Hyungsoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 284 days.

(21) Appl. No.: 18/135,441

(22) Filed: Apr. 17, 2023

(65) Prior Publication Data

US 2024/0167742 A1  May 23, 2024

(30) Foreign Application Priority Data

Nov. 17, 2022  (KR) .................. 10-2022-0154652

(51) Int. Cl.
*F25B 41/31* (2021.01)
*F24F 13/30* (2006.01)
*F25B 41/40* (2021.01)

(52) U.S. Cl.
CPC .............. *F25B 41/31* (2021.01); *F24F 13/30* (2013.01); *F25B 41/40* (2021.01)

(58) Field of Classification Search
CPC ... F24F 13/30; F25B 13/00; F25B 2313/0233; F25B 2313/0234; F25B 2600/2519;
(Continued)

(56) References Cited

U.S. PATENT DOCUMENTS

| | | | |
|---|---|---|---|
| 2014/0245772 A1* | 9/2014 | Gerlach | F24F 3/1411 62/271 |
| 2017/0299202 A1* | 10/2017 | Hancock | F24F 3/14 |
| 2021/0262692 A1* | 8/2021 | Yoon | F24F 11/89 |

FOREIGN PATENT DOCUMENTS

| | | |
|---|---|---|
| KR | 10-2005-0118450 | 12/2005 |
| KR | 10-2007-0031712 | 3/2007 |

(Continued)

OTHER PUBLICATIONS

Korean Office Action dated Feb. 11, 2025 issued in Application No. 10-2022-0154652.

*Primary Examiner* — Henry T Crenshaw
(74) *Attorney, Agent, or Firm* — KED & ASSOCIATES, LLP

(57) ABSTRACT

An air conditioner comprises an outdoor unit including a compressor and an outdoor heat exchanger; and an indoor unit connected to the outdoor unit by a gas pipe and a liquid pipe and having an indoor heat exchanger including a first coil and a second coil branched from the gas pipe and connected in parallel, a first manifold and a second manifold connected by refrigerant pipes to enable refrigerant to flow to the indoor heat exchanger, a first expansion valve and a second expansion valve connected in parallel to the liquid pipe and that block or expand the refrigerant, refrigerant flow pipes connecting a gas pipe side of the first manifold and an outlet side of the second expansion valve, a third expansion valve installed on the refrigerant flow pipe to block or expand the refrigerant, and a control valve installed on the gas pipe to block the refrigerant.

19 Claims, 13 Drawing Sheets

(58) Field of Classification Search
CPC ........ F25B 39/028; F25B 41/20; F25B 41/31; F25B 41/40; F25B 49/02
See application file for complete search history.

(56) References Cited

FOREIGN PATENT DOCUMENTS

| | | |
|---|---|---|
| KR | 10-2019-0055961 | 5/2019 |
| KR | 10-2021-0108240 | 9/2021 |

* cited by examiner

AIR CONDITIONER AND METHOD FOR CONTROLLING SAME

CROSS-REFERENCE TO RELATED APPLICATION(S)

This application claims priority under 35 U.S.C. §§ 119 and 365 to Korean Application No. 10-2022-0154652, filed in Korea on Nov. 17, 2022, whose entire disclosure is hereby incorporated by reference.

BACKGROUND

1 Field

The present disclosure relates to an air conditioner and a method for controlling the same, and more particularly, to an air conditioner capable of improving energy efficiency according to different operation loads, and a method for controlling the same.

2. Background

In general, an air conditioner uses refrigerant cycle components composed of a compressor, a condenser, an expansion device, an evaporator, and the like to cool or heat air in a room, to control moisture in the air, or purify air in order to create a more comfortable indoor environment for users. In one example, an air conditioner for cooling and heating an indoor space may include an air handling unit (AHU), which is also referred to as an indoor unit, and an outdoor unit.

The AHU may be a ventilation combining air conditioning unit that mixes outdoor air with indoor air, heat-exchanges the mixed air in a heat exchanger, and then supplies the heat-exchanged mixed air to one or more rooms. The AHU may be installed in an air conditioning room, machine room, or the like within a building or house to be provided separately from the one or more rooms receiving the supplied air. For example, the supplied air from the AHU may be distributed to one or more rooms via a flow of air through a duct connecting the rooms and the AHU. The outdoor unit may supply refrigerant to a heat exchanger of the AHU using the refrigeration cycle components, may include one or more of a compressor, a condenser, an expansion device, an evaporator, and the like forming the refrigeration cycle to modify a temperature of the refrigerant.

Korea Patent Publication No. 2021-0108240 teaches a unitary type air conditioner having a square frame and an A-COIL whose lower end is supported on the upper side of the frame. The A coil includes a first coil and a second coil in the air handling unit so that the refrigerant flows therein, and air passing through the frame exchanges heat with the refrigerant to distribute the conditioned air to the room.

However, this air conditioner may operate inefficiently in a partial load cycle mode because the cycle of this air conditioner is configured to focus on a full load without responding to the performance of the load during a cooling and/or heating operation. It may be desirable to improve the efficiency of both the full load cycle and the partial load cycle in order to satisfy the annual efficiency standards, such as the Seasonal Energy Efficiency Ratio (SEER) and the Heating Seasonal Performance Factor (HSPF) of North America.

In addition, this air conditioner may perform dehumidification through a cooling operation during a dehumidification operation, and a separate heater may be applied for reheating to increase the air temperature lowered by the cooling operation. However, using the separate heater for reheating causes a large amount of power to be consumed, resulting in a decrease in energy efficiency.

BRIEF DESCRIPTION OF THE DRAWINGS

Embodiments will be described in detail with reference to the following drawings in which like reference numerals refer to like elements, and wherein.

DETAILED DESCRIPTION

Figure 1:
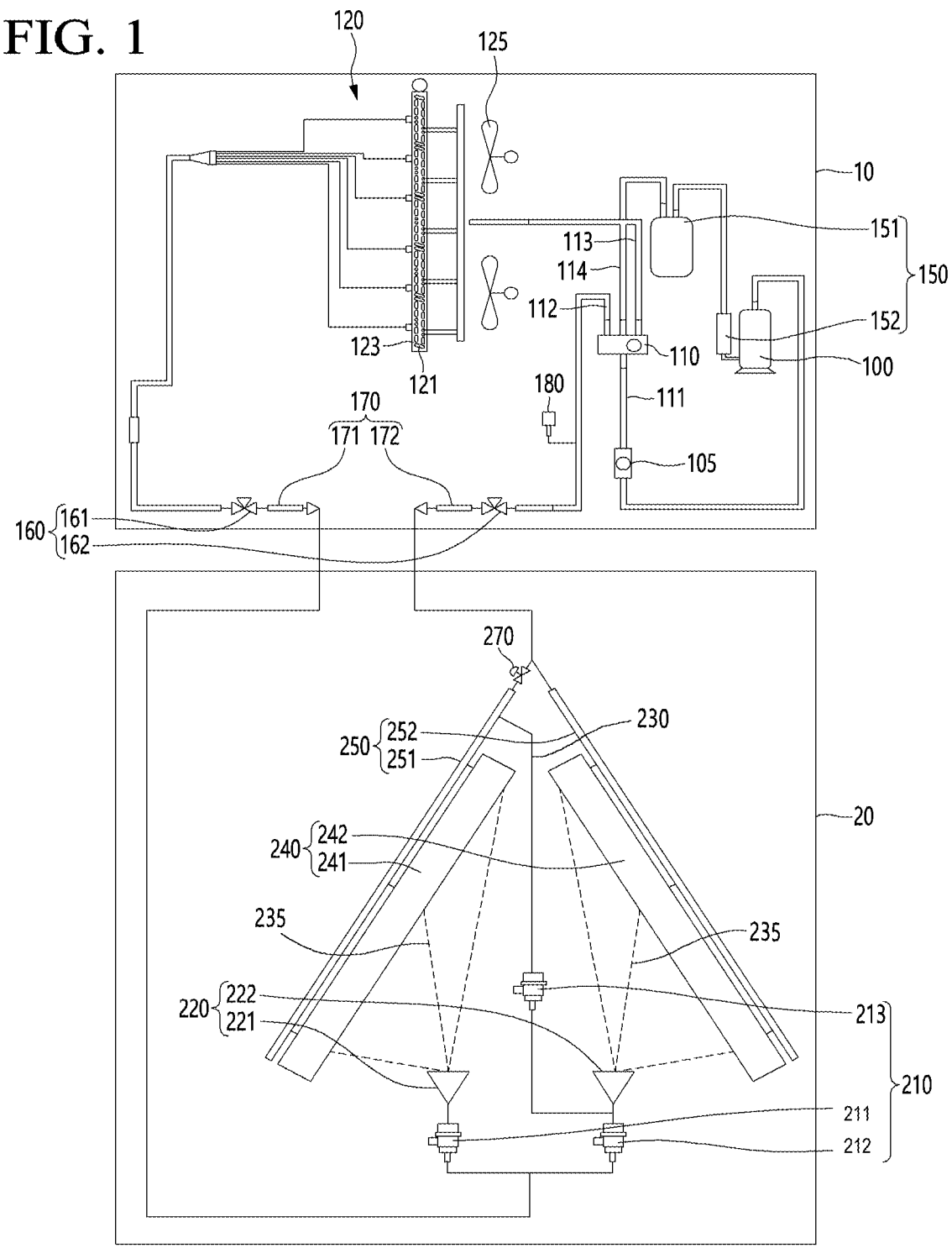
FIG. 1 is a view illustrating an air conditioner according to an embodiment of the present disclosure.

Hereinafter, specific embodiments of the present disclosure will be described with reference to the drawings. However, the spirit of the present disclosure is not limited to the presented embodiments, and those skilled in the art who understand the spirit of the present disclosure can easily propose other embodiments included within the scope of the same spirit by adding, deleting, changing, and supplementing components but it will be said that this is also included within the scope of the spirit of the present disclosure.

In adding reference numerals to components of each drawing, it should be noted that the same components have the same numerals as much as possible even if they are displayed on different drawings. In addition, in describing an embodiment of the present disclosure, if it is determined that a detailed description of a related known configuration or function hinders understanding of the embodiment of the present disclosure, the detailed description is omitted.

Also, terms such as first, second, A, B, (a), (b) or the like may be used herein when describing components of the embodiment of the present disclosure. Each of these terminologies is not used to define an essence, order or sequence of a corresponding component but used merely to distinguish the corresponding component from other component(s). It should be noted that when a component is described as being "connected," "coupled," or "joined" to another component, that component may be directly connected or joined to the other component, but another component may be "connected", "coupled" or "joined" between each component.

FIG. 1 is a view illustrating an air conditioner according to an embodiment of the present disclosure. An air conditioner according to an embodiment of the present disclosure may refer to a device for maintaining indoor air in the most suitable state according to use and purpose. For example, the air conditioner may perform ventilation by supplying conditioned air to an indoor space and exhausting polluted air from the indoor space.

In the displayed configuration, the air conditioner may include an outdoor unit 10 installed outdoors and an indoor unit 20 connected to the outdoor unit 10 and installed indoors. In particular, the air conditioner may be implemented as a separate type air conditioner in which the outdoor unit 10 and the indoor unit 20 are separated. As illustrated in FIG. 1, an air conditioner according to an embodiment of the present disclosure includes the outdoor unit 10 and the indoor unit 20 that may operate a refrigerant cycle in which a refrigerant circulates. In the present disclosure, pipes provided in the outdoor unit 10 and the indoor unit 20 and through which the refrigerant circulates may be referred to as refrigerant pipes.

First, the outdoor unit 10 according to an embodiment of the present disclosure will be described. The outdoor unit 10 may include a compressor 100, a muffler 105, a flow control valve 110, an outdoor heat exchanger 120, a pressure sensor 180, and a gas-liquid separator 150. It should be appreciated that the outdoor unit 10 may omit one or more of these components and/or may include other components.

The compressor (or pump) 100 is a device for compressing refrigerant. For example, the compressor 100 may include a rotary inverter compressor. The compression capacity of the compressor 100 may determine a refrigerating capacity (or air conditioning capacity) of the air conditioner. The air conditioning capacity may include a cooling capacity or a heating capacity. In certain examples, regarding the cooling capacity of the air conditioner, the minimum capacity may be 43 kW, the medium capacity may be 102 kW, and the maximum rated capacity may be 145 kW. In certain examples, in relation to the heating capacity of the air conditioner, the minimum capacity may be 44 kW, the medium capacity may be 95 kW, and the maximum rated capacity may be 167 kW.

The muffler 105 may be disposed on an outlet side of the compressor 100. The muffler 105 may reduce noise generated in connection with high-temperature and high-pressure refrigerant discharged from the compressor 100. The muffler 105 may include a chamber (not illustrated) that increases the flow sectional area of the refrigerant, and the chamber may form a resonance chamber (not illustrated).

The flow control valve 110 may be disposed on an outlet side of the muffler 105 and may change a flow direction of the refrigerant compressed in the compressor 100. The flow control valve 110 may include, for example, a four-way valve. As an example, flow control valve 110 may include a first port 111 into which high-temperature and high-pressure refrigerant compressed by the compressor 100 flows, a second port 112 connected to a pipe extending from the flow control valve 110 toward the outdoor heat exchanger 120, a third port 113 connected to a pipe extending from the flow control valve 110 to the indoor unit 20, and a fourth port 114 extending from the flow control valve 110 to the gas-liquid separator 150. In this example, the refrigerant compressed in the compressor 100 may flow into the flow control valve 110 through the first port 111 after passing through the muffler 105.

When the air conditioner is in a cooling operation, the hot and compressed refrigerant flowing into the flow control valve 110 may flow to the outdoor heat exchanger 120. As an example, the refrigerant may be discharged from the second port 112 of the flow control valve 110 and introduced into the outdoor heat exchanger 120. On the other hand, when the air conditioner is in a heating operation, the refrigerant flowing into the flow control valve 110 may flow to the indoor unit 20. As an example, the refrigerant may be discharged from the third port 113 of the flow control valve 110 and flow into the indoor unit 20.

The outdoor heat exchanger 120 may be disposed on the outlet side of the flow control valve 110 to exchange heat with outside air and change the received hot and high-pressure refrigerant to a medium-temperature and high-pressure state. In one example, the outdoor heat exchanger 120 may include a heat exchange pipe 121 and a holder 123 supporting the heat exchange pipe 121, and the holder 123 may support one or both sides of the heat exchange pipe 121. Although not illustrated in the drawing, the outdoor heat exchanger 120 further includes a heat exchange fin coupled to the heat exchange pipe 121 to assist heat exchange with outside air. As depicted in FIG. 1, a blowing fan 125 for supplying a flow of air to the outdoor heat exchanger 120 may be included on one side of the outdoor heat exchanger 120.

The outdoor unit 10 may include a three-way valve 160 to which a connection pipe 170 is connected when assembled with the indoor unit 20. Here, the connection pipe 170 may be a pipe connecting the outdoor unit 10 and the indoor unit 20. In this example, the outdoor unit 10 and the indoor unit 20 may be fluidly connected through the connection pipe 170 to exchange the refrigerant.

The three-way valve 160 may include a first three-way valve 161 provided on one side of the outdoor unit 10 and a second three-way valve 162 provided on the other side of the outdoor unit 10. The connection pipe 170 may include a first connection pipe (or liquid pipe) 171 extending from the first three-way valve 161 to the indoor unit 20 and a second connection pipe (or gas pipe) 172 extending from the second three-way valve 162 to the indoor unit 20. Accordingly, the first connection pipe 171 may be connected to one side of the indoor unit 20 and the second connection pipe 172 may be connected to another side of the indoor unit 20, different from the side connected to the first connection pipe 171. In one example, the first connection pipe 171 may be a liquid pipe through which the liquid-phase refrigerant discharged from the compressor 100 or the two-phase refrigerant in which the liquid-phase and gas-phase are mixed can be supplied to the indoor unit 20, and the second connection pipe 172 may be a gas pipe through which the gas-phase refrigerant discharged from the compressor 100 may be supplied to the indoor unit 20.

The pressure sensor 180 may be installed in a refrigerant pipe extending from the second port 112 of the flow control valve 110 to the second three-way valve 162, and the pressure sensor 180 may detect a pressure of the refrigerant being supplied toward the indoor unit 20. In other examples, the 180 may be installed in a refrigerant pipe extending one or more other ports of the flow control valve 110. As previously described, the refrigerant exiting the flow control valve 110 and sensed by the pressure sensor 180 may be at a high pressure after being compressed in the compressor 100.

The gas-liquid separator 150 may be disposed at the inlet side of the compressor 100 to separate a gas-phase refrigerant from an evaporated low-pressure refrigerant and provide the gas-phase refrigerant to the compressor 100. The gas-liquid separator 150 may include a first gas-liquid separator 151 connected to the fourth port 114 of the flow control valve 110 and a second gas-liquid separator 152 provided in an outlet side of the first gas-liquid separator 151 or the outlet side of the compressor 100. In other words, the second gas-liquid separator 152 may be disposed between the first gas-liquid separator 151 and the compressor 100. Here, the first gas-liquid separator 151 may be referred to as a 'main gas-liquid separator' and the second gas-liquid separator 152 may be referred to as an 'auxiliary gas-liquid separator'.

The outdoor unit 10 may include a refrigerant pipe extending from the fourth port 114 of the flow control valve 110 to the compressor 100. The first gas-liquid separator 151 and the second gas-liquid separator 152 may be installed in this refrigerant pipe. The gas-phase refrigerant separated by the gas-liquid separator 150 may be suctioned into the compressor 100.

The indoor unit 20 according to an embodiment of the present disclosure will be described. In certain examples, the indoor unit 20 may include an expansion device 210, a distribution device 220, an indoor heat exchanger 240, a manifold device 250, and a control valve 270. It should be appreciated that the indoor unit 20 may omit one or more of these components and/or may include other components.

The first connection pipe 171 of the first connection pipe 170 may be a liquid pipe and may be disposed on an outlet side of the first three-way valve 161, and the second three-way valve 162 of the outdoor unit 10 may be connected to the indoor unit 20.

Two or more of the expansion devices 210 may branched from the first connection pipe 171 and may be connected side-by-side in parallel. For example, the expansion device 210 may include a plurality of first expansion valves 211 and second expansion valves 212 that are connected in parallel to the refrigerant pipe, and may expand and depressurize the refrigerant. Similar to known air conditioners, the expansion devices 210 may be installed in the outdoor unit 10, but in the air conditioner of the present disclosure, the expansion devices 210 installed in the outdoor unit 10 preferably are not overlapped with the indoor unit 20.

The distribution device 220 may including a first distributor (or first distribution device) 221 and a second distributor (or second distribution device) 222 connected in series to correspond, respectively, to the expansion devices 210. For example, the first distributor 221 and the second distributor 222 may be connected side by side in parallel, like the first expansion valve 211 and the second expansion valve 212. The first distributor 221 and the second distributor 222 of the distribution device 220 may distribute and supply the refrigerant flowing therein through the first connection pipe 171 (liquid pipe) to the indoor heat exchanger 240 through a plurality of flow paths. For example, the refrigerant may flow from the first distributor 221 and the second distributor 222 of the distribution device 220 and to a first coil 241 and a second coil 242 of the indoor heat exchanger 240 and may flow through a plurality of refrigerant supply pipes 235.

The indoor heat exchanger 240 is a device that exchanges heat between air and a refrigerant, and may include a first coil 241 and a second coil 242 in which the refrigerant flows. Air flowing through the indoor heat exchanger 240 and then to a room exchanges heat with the refrigerant to be conditioned and then distributed to the room.

The indoor heat exchanger 240 composed of the first coil 241 and the second coil 242 may include, for example, a plurality of tubes (not illustrated) in which the refrigerant flows and a plurality of heat dissipation fins (not illustrated) coupled around the tubes to enable heat transfer to promote heat exchange between the tubes. The tubes may be disposed in a zigzag shape along a vertical direction and connected in communication with each other, and a plurality of heat dissipation fins may be coupled at a predetermined pitch in the longitudinal direction of the tubes forming a row in the vertical direction.

The heat dissipation fin is a thermally conductive member and may consist of a plate (not illustrated) formed in a long plate shape, a plurality of tube insertion holes formed to allow tubes to be inserted through the plate surface, and a plurality of slit pins (not illustrated) formed to promote heat transfer between the tube insertion holes. The slit pins may be recessed from one plate surface in the thickness direction of the plate, protrude toward the other plate surface, and the slit pins may be formed to extend in the longitudinal direction of the plate and may be spaced apart from each other in the width direction of the plate.

The first coil 241 and the second coil 242 configured in this way may communicate with each manifold device 250 through refrigerant pipes. The manifold device 250 may include, for example, a first manifold 251 and a second manifold 252 formed in the shape of a straight rod with hollow inside through which the refrigerant can flow. The first manifold 251 and the second manifold 252 may be formed, for example, to a size sufficient to cover a size of the indoor heat exchanger 240.

The first manifold 251 and the second manifold 252 may be provided in parallel to the first coil 241 and the second coil 242 of the indoor heat exchanger 240, respectively. During a cooling operation, the refrigerant flowing therein from the outdoor unit 10 through the first connection pipe 171 (that is, the liquid pipe) may flow from the first coil 241 and the second coil 242 of the indoor heat exchanger 240 and to the first manifold 251 and the second manifold 252, respectively. On the other hand, during a heating operation, the refrigerant flowing therein from the outdoor unit 10 through the second connection pipe 172 (that is, the gas pipe) is discharged from the first manifold 251 and the second manifold 252 and to the first coil 241 and the second coil 242 of the indoor heat exchanger 240.

The first manifold 251 and the second manifold 252 of the manifold device 250 may be formed to face each other, with the lower portions thereof having a wider separation width, and the upper portions thereof having a relatively narrower separation width than the lower portion. In this way, the first manifold and the second manifold may be formed to be inclined, respectively. In addition, the first coil 241 and the second coil 242 may be disposed side by side on the first manifold 251 and the second manifold 252 may be also formed to face each other in an inclined shape, respectively.

A refrigerant flow pipe 230, which is a refrigerant pipe through which refrigerant flows, may be provided on the gas pipe side of the first manifold 251 and the outlet side of the second expansion valve 212, and a third expansion valve 213 may be provided on the refrigerant flow pipe 230 to block the flow of refrigerant or to expand and depressurize the refrigerant. In addition, a control valve 270 blocking the flow of refrigerant flowing from the first manifold 251 to the gas pipe or the flow of refrigerant flowing from the gas pipe to the first manifold 251 may be provided the second connection pipe 172, that is, the gas pipe, which is connected to the first manifold 251.

The indoor unit 20 may be connected to the outdoor unit 10 through the first connection pipe 171 (i.e., the liquid pipe) and the second connection pipe 172 (i.e., the gas pipe). A plurality of components of the outdoor unit 10 and the indoor unit 20 may be connected by a refrigerant pipe, and the refrigerant pipe represents a path to guide a circulation of the refrigerant in the outdoor unit 10 and the indoor unit 20. It can be understood that the first connection pipe 171 and the second connection pipe 172 are also included in the configuration of the refrigerant pipe.

Based on the configuration of the outdoor unit 10 and the indoor unit 20 configured as described above, a method for controlling an air conditioner according to the present disclosure will be described. An air conditioner according to an embodiment of the present disclosure performs an air conditioning operation of cooling and dehumidification, and a heating operation. The air conditioning operation may be performed by selecting a full load (high load) operation and a partial load (low load) operation, respectively, by determining the operation rate of the compressor 100 and the indoor load.

Refrigerant flows into the indoor unit 20 through the liquid pipe of the outdoor unit 10, and the refrigerant circulates along the refrigerant circulation flow path of the indoor unit 20 through the opening and closing of internal valves. In the following discussion of the refrigerant cycle of the air conditioner according to embodiments of the present disclosure, among the valves illustrated in the drawings, the second expansion valve 212, the third expansion valve 213, and the control valve 270 indicated by 'X' indicate a state where the flow of refrigerant is blocked, and it can be understood that the flow of the refrigerant is impossible.

Figure 2:
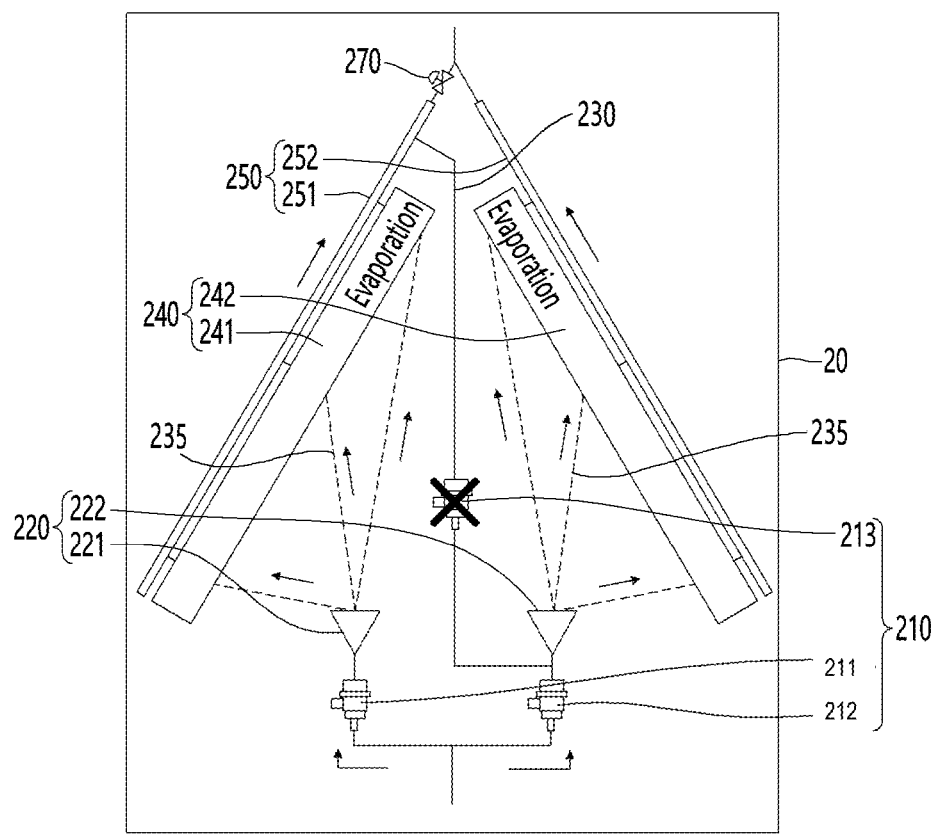
FIG. 2 is a view illustrating a refrigerant cycle during a cooling full load operation of an air conditioner according to an embodiment of the present disclosure.
Figure 3:
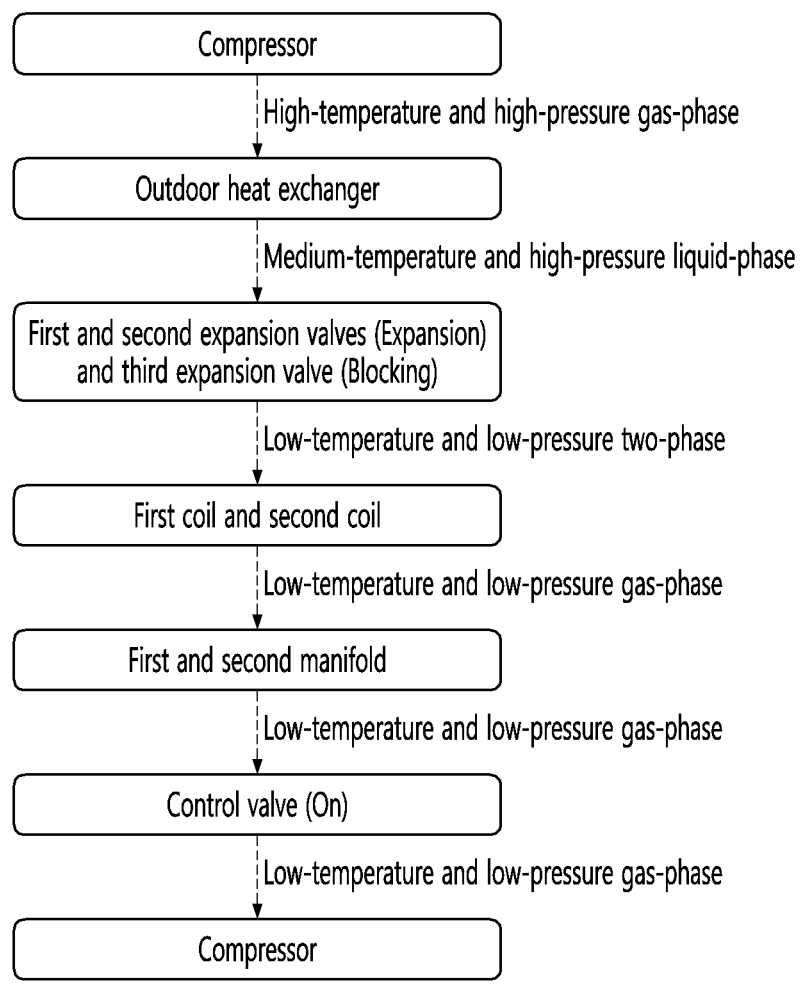
FIG. 3 is a flowchart illustrating a cooling full load operation logic of an air conditioner according to an embodiment of the present disclosure.

FIG. 2 is a view illustrating a refrigerant cycle during a cooling full load operation of an air conditioner according to an embodiment of the present disclosure, and FIG. 3 is a flowchart illustrating a cooling full load operation logic of an air conditioner according to an embodiment of the present disclosure. As illustrated in FIG. 2, the refrigerant flowing into the indoor unit 20 from the outdoor unit 10 through the first connection pipe 171 (that is, the liquid pipe) may proceed to the expansion device 210. At this time, the expansion device 210 may be branched into the first expansion valve 211 and the second expansion valve 212 and may be connected to the first distributor and the second distributor. Accordingly, the refrigerant may expand in the first expansion valve 211 and the second expansion valve 212 to perform a pressure reduction operation and may proceed to the indoor heat exchanger 240. The refrigerant flowing into the indoor heat exchanger 240 may be evaporated in the first coil 241 and the second coil 242. The refrigerant may then proceed to the first manifold 251 and the second manifold 252 of the manifold device 250 communicating with the first coil 241 and the second coil 242 and may then circulates to the outdoor unit 10 through the second connection pipe 172 connected to the first manifold 251 and the second manifold 252. At this time, the third expansion valve 213 installed on the refrigerant flow pipe 230 connected to the gas pipe side of the first manifold 251 and the outlet side of the second expansion valve 212 may perform an off operation. At this time, the refrigerant does not pass through the refrigerant flow pipe 230 since the third expansion valve 213 is switched off.

Referring to FIG. 3, the flow of refrigerant during the cooling full load operation logic of the air conditioner will be described. The high-temperature and high-pressure gas-phase refrigerant discharged from the compressor 100 of the outdoor unit 10 may pass through the outdoor heat exchanger 120 and may be condensed to become a medium-temperature and high-pressure liquid-phase refrigerant. The liquid-phase refrigerant may be supplied to the indoor unit 20 through the first connection pipe 171 (i.e., the liquid pipe).

The liquid-phase refrigerant supplied into the indoor unit 20 through the first connection pipe 171 may be expanded by the first expansion valve 211 and the second expansion valve 212 to become a low-temperature, low-pressure, two-phase refrigerant. The two-phase refrigerant expanded in the first expansion valve 211 and the second expansion valve 212 and flowing to the first distributor 221 and the second distributor 222 may pass through the first coil 241 and the second coil 242 of the indoor heat exchanger 240.

The refrigerant may be evaporated while flowing through the first coil 241 and the second coil 242. Accordingly, among the refrigerants in a two-phase state in which the liquid-phase and the gas-phase are mixed, the liquid-phase refrigerant evaporates, and only the low-temperature and low-pressure gas-phase refrigerant (e.g., gas-phase refrigerant) remains. The gas-phase refrigerant may flow to the first manifold 251 and the second manifold 252 through the refrigerant pipe and may circulate to the outdoor unit 10 through the second connection pipe 172 (i.e., the gas pipe).

In the case of a cooling full load operation of the air conditioner according to an embodiment of the present disclosure, the refrigerant supplied through the first connection pipe 171 may be connected in parallel from the distribution device 220 to the indoor heat exchanger 240, and thus, since the low-pressure loss flow path is implemented, pressure loss is minimized and since the temperature of the indoor heat exchanger 240 is maintained at a low state, a power consumption of the air conditioner may be minimized.

Figure 4:
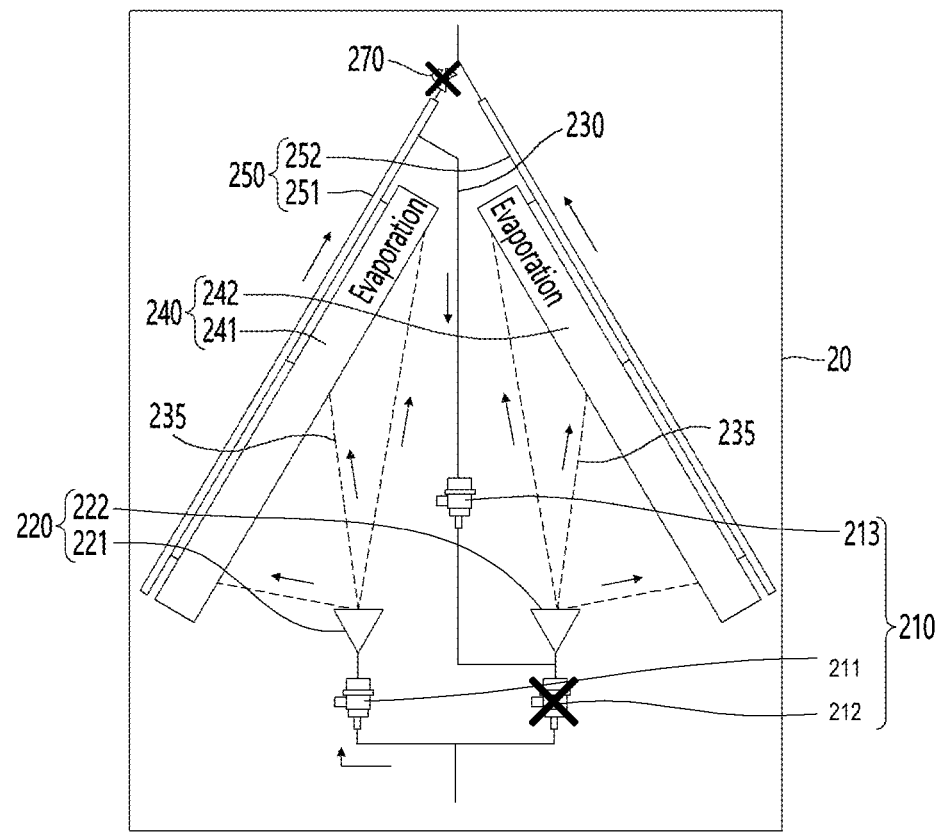
FIG. 4 is a view illustrating a refrigerant cycle during a cooling partial load operation of an air conditioner according to an embodiment of the present disclosure.
Figure 5:
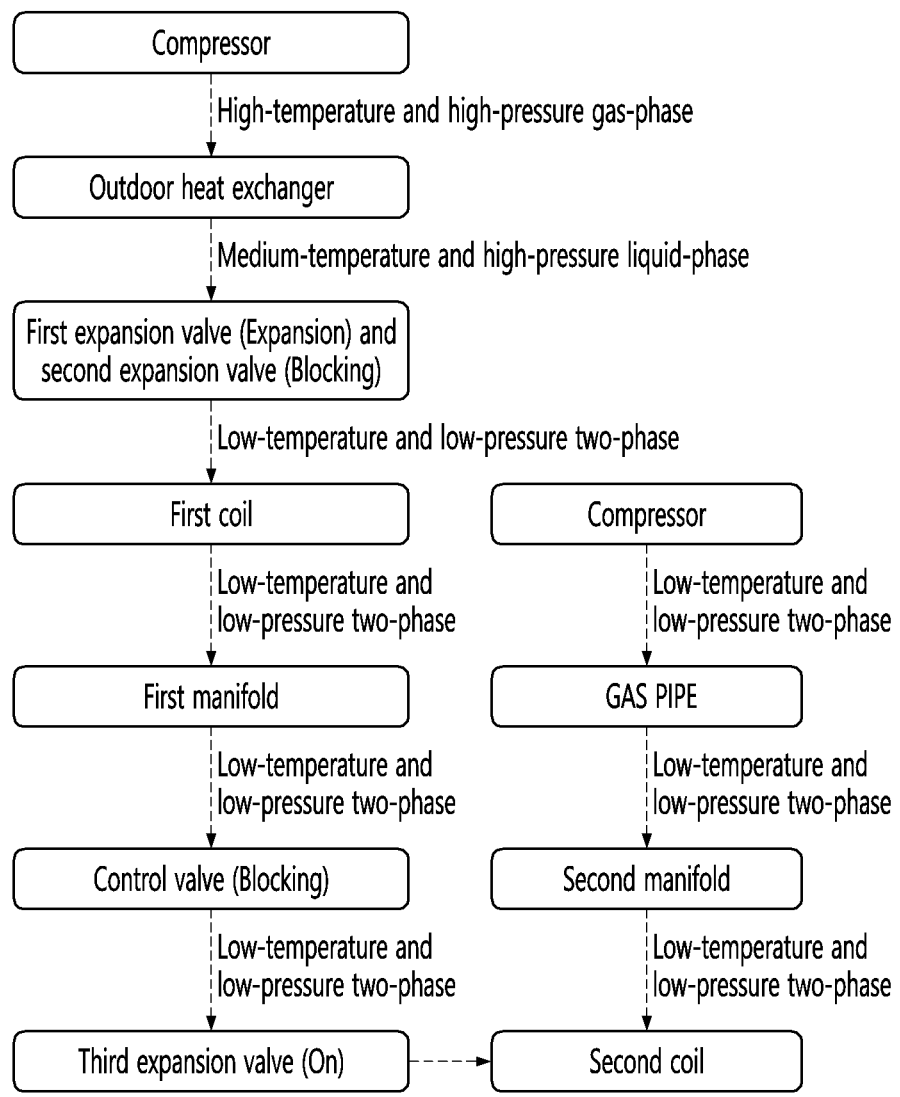
FIG. 5 is a flowchart illustrating a cooling partial load operation logic of an air conditioner according to an embodiment of the present disclosure.

FIG. 4 is a view illustrating a refrigerant cycle during a cooling partial load operation of an air conditioner according to an embodiment of the present disclosure, and FIG. 5 is a flowchart illustrating a cooling partial load operation logic of an air conditioner according to an embodiment of the present disclosure. As illustrated in FIG. 4, the refrigerant flowing into the indoor unit 20 from the outdoor unit 10 through the first connection pipe 171 (that is, the liquid pipe) may proceed to the expansion device 210. At this time, the second expansion valve 212 of the expansion device 210 may perform an off operation. Accordingly, the refrigerant expands in the first expansion valve 211 of the expansion device 210 to perform a pressure reduction operation, and at the same time, the flow is blocked in the second expansion valve 212. Thus, the refrigerant expanded by the first expansion valve 211 may pass through the first distributor 221 and proceed to the first coil 241 of the indoor heat exchanger 240. The refrigerant may proceed to the first coil 241 of the indoor heat exchanger 240 and pass through the first manifold 251 of the manifold device 250.

At this time, the control valve 270 connected between the first manifold 251 and the gas pipe may also perform an off operation. In addition, the third expansion valve 213 installed on the refrigerant flow pipe 230 connected to the gas pipe side of the first manifold 251 and the outlet side of the second expansion valve 212 performs an on operation. Accordingly, the refrigerant proceeds to the first manifold 251, the refrigerant flow pipe 230, the second coil 242, and the second manifold 252 and circulates to the outdoor unit 10 through the second connection pipe 172. At this time, the flow of refrigerant from the second expansion valve 212 to the second distributor 222 may be blocked. In addition, the flow of the refrigerant from the first manifold 251 to the second connection pipe 172 (e.g., the gas pipe) may be blocked.

Referring to FIG. 5, the flow of refrigerant during the cooling partial load operation logic of the air conditioner will be described. The high-temperature and high-pressure gas-phase refrigerant discharged from the compressor 100 of the outdoor unit 10 may pass through the outdoor heat exchanger 120 and may be condensed to become a medium-temperature and high-pressure liquid-phase refrigerant. The liquid-phase refrigerant may be supplied to the indoor unit 20 through the first connection pipe 171.

The flow of the liquid-refrigerant supplied into the indoor unit 20 through the first connection pipe 171 may be blocked by the second expansion valve 212 and may be expanded by the first expansion valve 211 to be a low-temperature, low-pressure two-phase refrigerant. The two-phase refrigerant that expands in the first expansion valve 211 and flows to the first distributor 221 may pass through the first coil 241 of the indoor heat exchanger 240.

The refrigerant may be evaporated while flowing through the first coil 241. However, among the two-phase refrigerants in which the liquid-phase and gas-phase phase are mixed, the liquid-phase refrigerant may be evaporate first, but the evaporation amount may be small so that the low-temperature, low-pressure two-phase refrigerant (two-phase refrigerant) remains. The two-phase refrigerant may flow to the first manifold 251 through the refrigerant pipe, and since the control valve 270 is turned off, the refrigerant may be not flow to the second connection pipe 172 and the refrigerant flows along the refrigerant flow pipes 230 provided at the gas pipe side of the first manifold 251 and the outlet side of the second expansion valve 212. In the process of the refrigerant flowing along the refrigerant flow pipe 230, the third expansion valve 213 may be turned on, so that the refrigerant may pass through and flow to the second coil 242 of the indoor heat exchanger 240.

The refrigerant may be evaporated while flowing through the second coil 242. Accordingly, among the two-phase refrigerants in which the liquid-phase and the gas-phase are mixed, the liquid-phase refrigerant undergoes a secondary evaporation, and only the low-temperature and low-pressure gas-phase refrigerant remains. The low-temperature, low-pressure gas-phase refrigerant may flow to the second manifold 252 through the refrigerant pipe and may circulate back to the outdoor unit 10 through the second connection pipe 172.

In the case of cooling partial load operation of the air conditioner according to the embodiment of the present disclosure, since the refrigerant path is arranged in series from the first expansion valve 211 to the second connection pipe 172 (that is, the gas pipe), the length of the refrigerant path may be relatively longer than in the case of the cooling full load operation. Accordingly, since the flow rate of the refrigerant increases and the heat transfer coefficient increases, energy efficiency can be increased under a cooling condition with a small load. In addition, in the cooling operation of the air conditioner, when the indoor temperature reaches the set temperature or the load of the compressor 100 is reduced to be switched to the partial load operation, the amount of circulation of the refrigerant may be reduced, thereby reducing power consumption.

Figure 6:
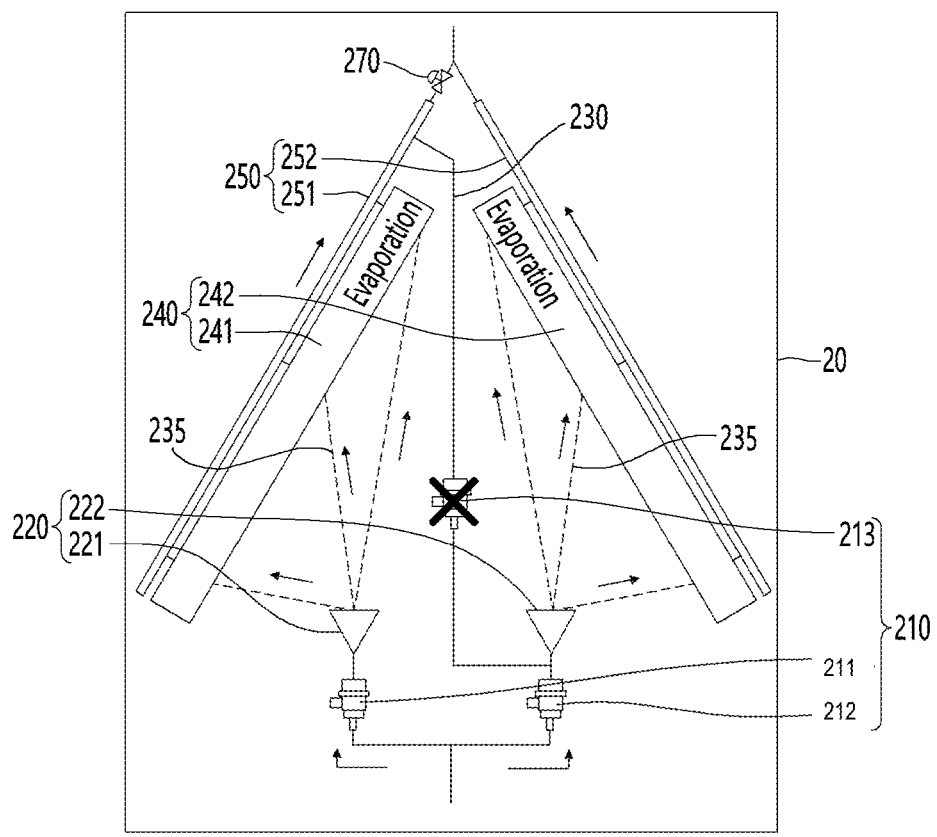
FIG. 6 is a view illustrating a refrigerant cycle during a high load dehumidification operation of an air conditioner according to an embodiment of the present disclosure.
Figure 7:
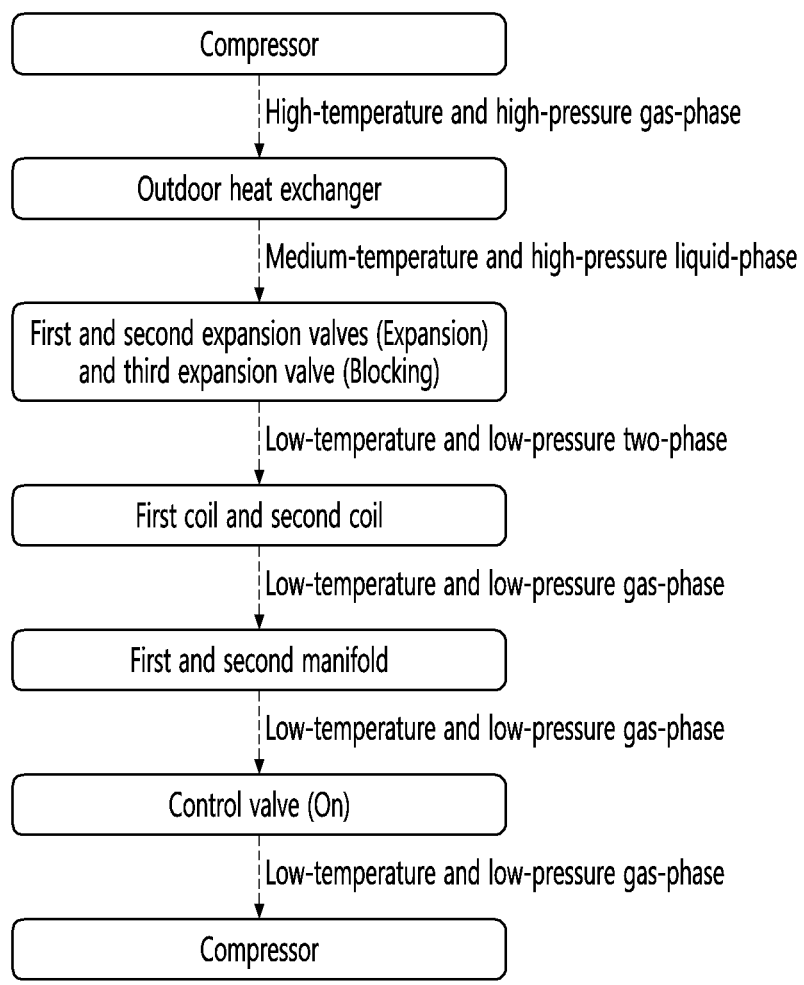
FIG. 7 is a flowchart illustrating a high load dehumidification operation logic of an air conditioner according to an embodiment of the present disclosure.

FIG. 6 is a view illustrating a refrigerant cycle during a high load dehumidification operation of an air conditioner according to an embodiment of the present disclosure, and FIG. 7 is a flowchart illustrating a high load dehumidification operation logic of an air conditioner according to an embodiment of the present disclosure. As illustrated in FIG. 6, the refrigerant flowing into the indoor unit 20 from the outdoor unit 10 through the first connection pipe 171 (that is, the liquid pipe) may proceed to the expansion device 210. At this time, the expansion device 210 may be branched into the first expansion valve 211 and the second expansion valve 212 and may be connected to the first distributor and the second distributor. Accordingly, the refrigerant may expand in the first expansion valve 211 and the second expansion valve 212 to perform a compression operation and may be proceed to the indoor heat exchanger 240.

The refrigerant flowing into the indoor heat exchanger 240 may be evaporated in the first coil 241 and the second coil 242. The refrigerant may proceed to the first manifold 251 and the second manifold 252 of the manifold device 250 communicating with the first coil 241 and the second coil 242 and may circulate back to the outdoor unit 10 through the second connection pipe 172 connected to the first manifold 251 and the second manifold 252. At this time, the third expansion valve 213 installed on the refrigerant flow pipe 230 connected to the gas pipe side of the first manifold 251 and the outlet side of the second expansion valve 212 may perform an off operation. At this time, the refrigerant may not pass through the refrigerant flow pipe 230.

Referring to FIG. 7, the flow of refrigerant during the cooling full load operation logic of the air conditioner will be described. The high-temperature and high-pressure gas-phase refrigerant discharged from the compressor 100 of the outdoor unit 10 may pass through the outdoor heat exchanger 120 and may be condensed to become a medium-temperature and high-pressure liquid-refrigerant. The liquid-refrigerant may be supplied to the indoor unit 20 through the first connection pipe 171 (that is, the liquid pipe).

The liquid-refrigerant supplied into the indoor unit 20 through the first connection pipe 171 may be expanded by the first expansion valve 211 and the second expansion valve 212 to become a low-temperature and low-pressure two-phase refrigerant. The two-phase refrigerant expanded in the first expansion valve 211 and the second expansion valve 212 and flowing to the first distributor 221 and the second distributor 222 may pass through the first coil 241 and the second coil 242 of the indoor heat exchanger 240.

The refrigerant may be evaporated while flowing through the first coil 241 and the second coil 242. Accordingly, among the two-phase refrigerant in which the liquid-phase and the gas-phase are mixed, the liquid-phase refrigerant may evaporate, and only the low-temperature and low-pressure gas-phase refrigerant may remain. The gas-phase refrigerant may flow to the first manifold 251 and the second manifold 252 through the refrigerant pipe and may be circulate back to the outdoor unit 10 through the second connection pipe 172 (i.e., the gas pipe).

In the case of high load dehumidification operation of the air conditioner according to the embodiment of the present disclosure, the refrigerant supplied through the first connection pipe 171 may be connected in parallel from the distribution device 220 to the indoor heat exchanger 240, and thus, since the low-pressure loss flow path is implemented, pressure loss may be minimized. Additionally, since the temperature of the indoor heat exchanger 240 may be maintained at a low state, high load dehumidification can be performed in a state where a heater is unnecessary. In this example, since the high load dehumidification operation may be performed during the cooling full load operation of the air conditioner, such a high load dehumidification operation may be correspond to the above-mentioned cooling full load operation, and since the temperature of the indoor heat exchanger 240 may be maintained at a low level, high-load dehumidification operation may be possible without using heating equipment such as a heater for raising air temperature in the constant temperature dehumidification process.

Figure 8:
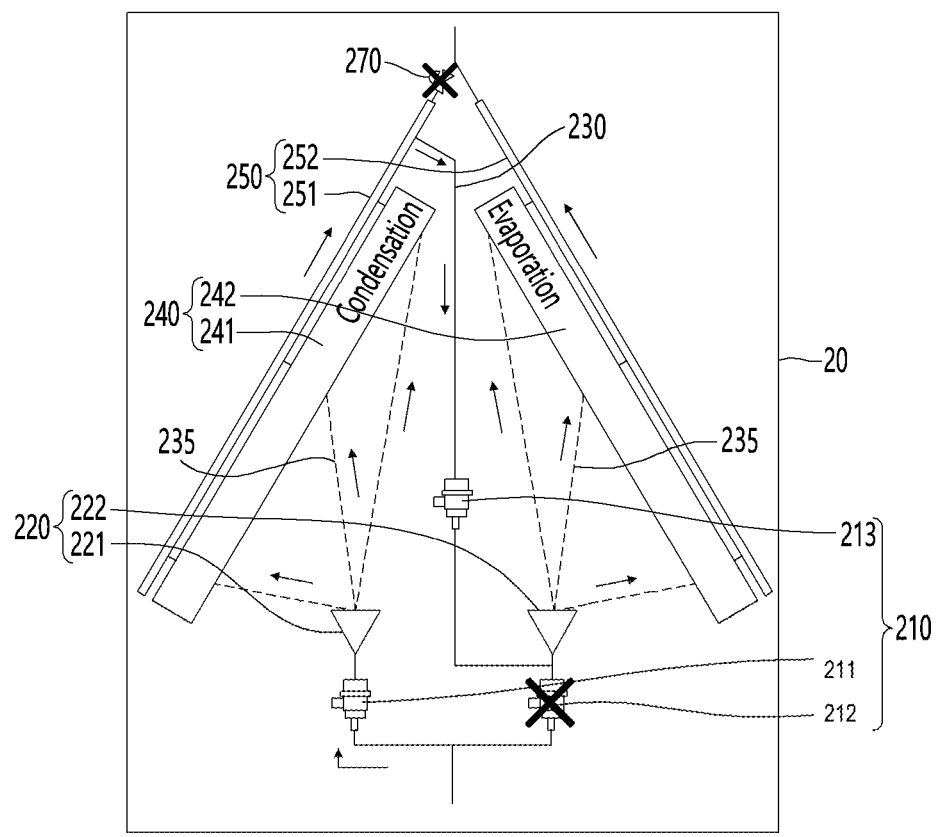
FIG. 8 is a diagram illustrating a refrigerant cycle during a low-load dehumidification operation of an air conditioner according to an embodiment of the present disclosure.
Figure 9:
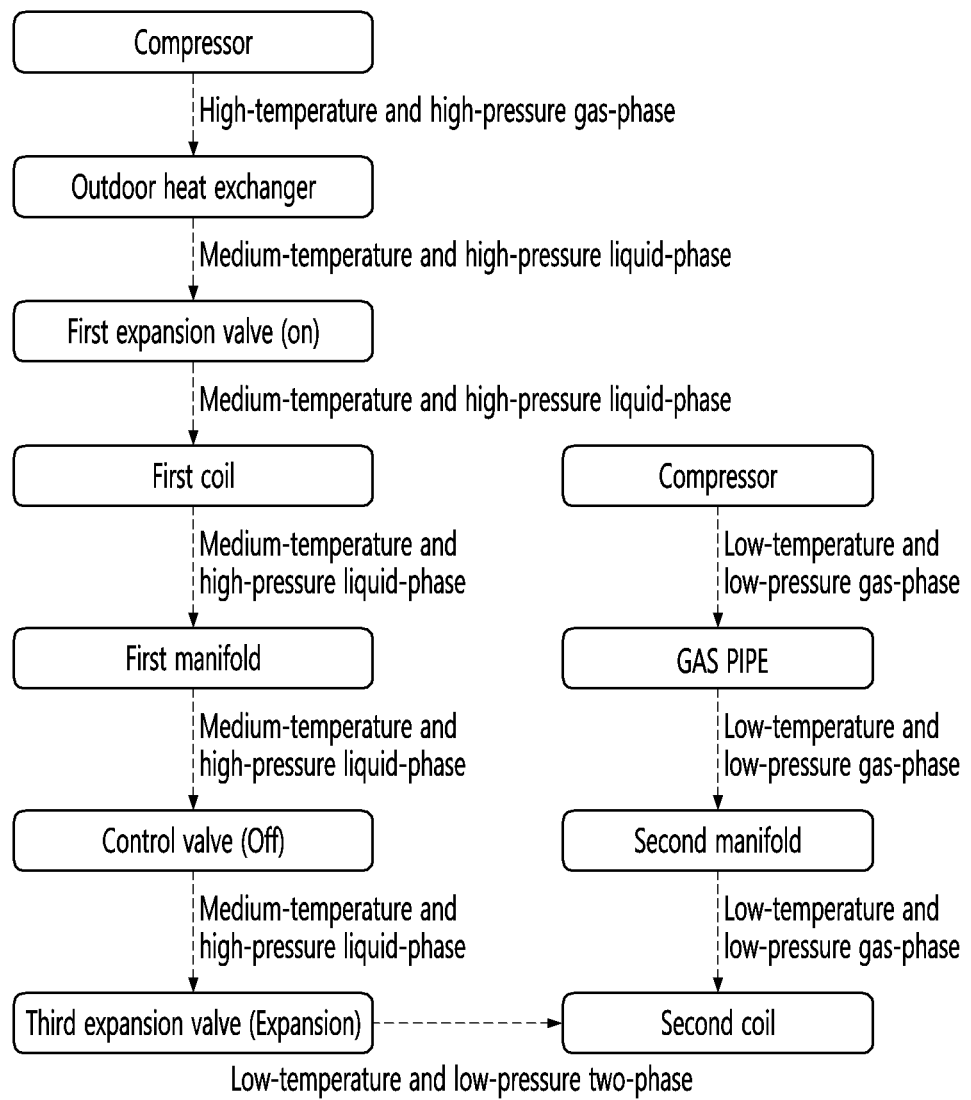
FIG. 9 is a flowchart illustrating a low-load dehumidification operation logic of an air conditioner according to an embodiment of the present disclosure.

FIG. 8 is a diagram illustrating a refrigerant cycle during a low-load dehumidification operation of an air conditioner according to an embodiment of the present disclosure, and FIG. 9 is a flowchart illustrating a low-load dehumidification operation logic of an air conditioner according to an embodiment of the present disclosure. As illustrated in FIG. 8, in the indoor unit 20, the first expansion valve 211 of the expansion device 210 may expand and depressurize. At the same time, the second expansion valve 212 may be blocked, the first coil 241 of the indoor heat exchanger 240 may be used as a condenser to perform a condensation operation, and the second coil 242 may be used as an evaporator to perform an evaporation operation.

In addition, the third expansion valve 213 installed on the refrigerant flow pipe 230 connected to the gas pipe side of the first manifold 251 and the outlet side of the second expansion valve 212 may perform an on operation, and a control valve 270 connected between the manifold 251 and the gas pipe may perform an off operation. Accordingly, the flow of refrigerant from the first manifold 251 to the second connection pipe 172 (i.e., the gas pipe) may be blocked.

Referring to FIG. 9, the flow of refrigerant during the low-load dehumidification operation logic of the air conditioner will be described. The high-temperature and high-pressure gas-phase refrigerant discharged from the compressor 100 of the outdoor unit 10 may pass through the outdoor heat exchanger 120 and may be condensed to become a medium-temperature and high-pressure liquid-refrigerant. The liquid-refrigerant is supplied to the indoor unit 20 through the first connection pipe 171 (that is, the liquid pipe). The liquid-refrigerant supplied into the indoor unit 20 through the first connection pipe 171 may be blocked by the second expansion valve 212, and since the first expansion valve 211 is opened, the liquid-refrigerant may pass through the first coil 241 of the indoor heat exchanger 240 via the first distributor 221.

The refrigerant may be condensed while flowing through the first coil 241. The refrigerant condensed in the first coil 241 may emit heat to warm air, thereby raising the indoor temperature and heating the room. The medium-temperature and high-pressure liquid-refrigerant of the first coil 241 may flow to the first manifold 251 through the refrigerant pipe, and since the control valve 270 is turned off, the refrigerant may not flow to the second connection pipe 172 (that is, to the gas pipe), and the refrigerant may flow along the refrigerant flow pipes 230 provided at the gas pipe side of the first manifold 251 and the outlet side of the second expansion valve 212. In the course of the refrigerant flowing along the refrigerant flow pipe 230, the third expansion valve 213 may expand and reduce a pressure thereof, and thus, may become a low-temperature and low-pressure two-phase refrigerant. The two-phase refrigerant may flow to the second coil 242 of the indoor heat exchanger 240 through the second distributor 222.

The low-temperature and low-pressure two-phase refrigerant may be evaporated while flowing through the second coil 242. Accordingly, among the two-phase refrigerants in which the liquid-phase and the gas-phase are mixed, the liquid-phase refrigerant may undergo a secondary evaporation, and only the low-temperature and low-pressure gas-phase refrigerant (i.e., the gas-phase refrigerant) may remain.

The low-temperature and low-pressure gas-phase refrigerant may be flow to the second manifold 252 through the refrigerant pipe and may circulate to the outdoor unit 10 through the second connection pipe 172. At this time, the second coil 242 may be operate as an evaporator and may function to remove moisture by lowering the humidity of the outside air.

In the case of low-load dehumidification operation of the air conditioner according to the embodiment of the present disclosure, the refrigerant may be condensed while flowing in the first coil 241 of the indoor heat exchanger 240, and the refrigerant condensed in the first coil 241 may heat the room by raising the indoor temperature. Accordingly, a sufficient heat amount for reheating can be secured in the air conditioner without a separate heater for reheating.

In addition, the refrigerant may be evaporated in the process of flowing through the second coil 242 of the indoor heat exchanger 240, and while the refrigerant evaporates through the second coil 242, the evaporation heat of the refrigerant released from the second coil 242 may be used to dehumidify from the outside air by removing moisture contained in the air. In this way, during the low-load dehumidification operation of the air conditioner, a constant temperature dehumidification cycle may be implemented to secure comfortable air and reduce energy loss due to the use of a heater for reheating during the dehumidification operation.

Figure 10:
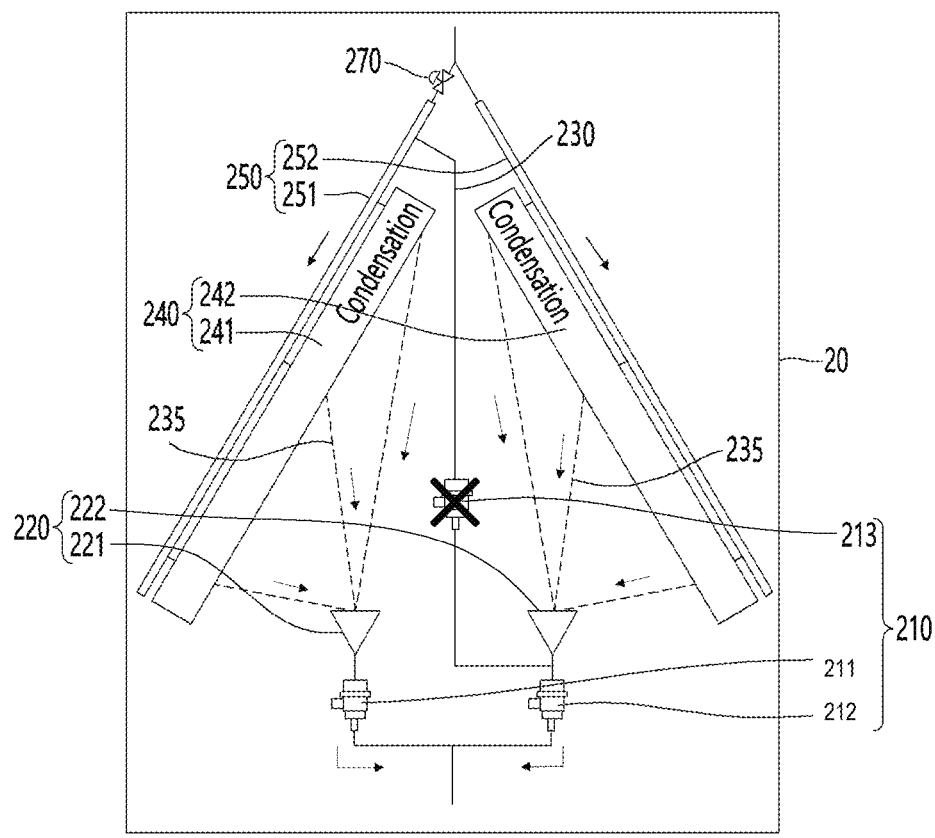
FIG. 10 is a view illustrating a refrigerant cycle during a heating full load operation of an air conditioner according to an embodiment of the present disclosure.
Figure 11:
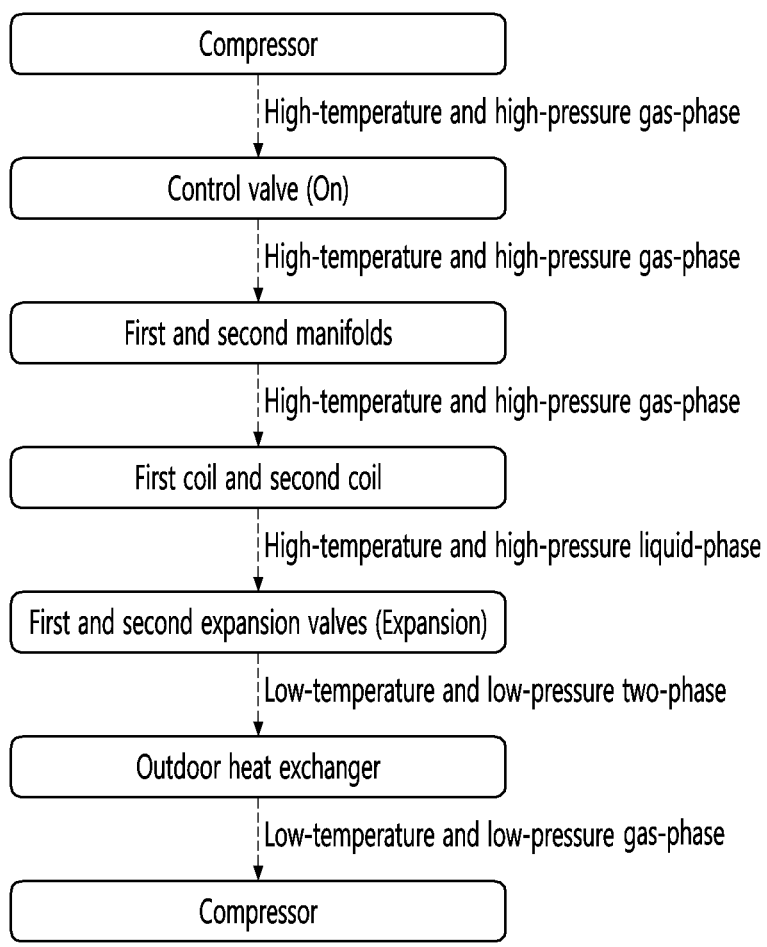
FIG. 11 is a flowchart illustrating a heating full load operation logic of an air conditioner according to an embodiment of the present disclosure.

FIG. 10 is a view illustrating a refrigerant cycle during a heating full load operation of an air conditioner according to an embodiment of the present disclosure, and FIG. 11 is a flowchart illustrating a heating full load operation logic of an air conditioner according to an embodiment of the present disclosure. As illustrated in FIG. 10, the refrigerant flowing from the outdoor unit 10 to the indoor unit 20 through the second connection pipe 172 (that is, the gas pipe) may proceed to the manifold device 250. The refrigerant may proceed from the first manifold 251 and the second manifold 252 of the manifold device 250 to the first coil 241 and the second coil 242 of the indoor heat exchanger 240. The refrigerant proceeding to the first coil 241 and the second coil 242 of the indoor heat exchanger 240 may proceed to the distribution device 220 including the first distributor 221 and the second distributor 222 connected in parallel. At this time, the third expansion valve 213 installed on the refrigerant flow pipe 230 connected to the gas pipe side of the first manifold 251 and the outlet side of the second expansion valve 212 may perform an off operation. The refrigerant proceeding to the distribution device 220 may proceed to the expansion device 210 and may circulate to the outdoor unit 10 through the first connection pipe 171 (that is, the liquid pipe).

Referring to FIG. 11, the flow of refrigerant during the heating full load operation logic of the air conditioner will be described. The high-temperature and high-pressure gas-phase refrigerant discharged from the compressor 100 of the outdoor unit 10 may pass through the second connection pipe 172 (i.e., the gas pipe) of the outdoor heat exchanger 120 and may be supplied to the indoor unit 20.

The high-temperature and high-pressure gas-phase refrigerant supplied to the indoor unit 20 may be supplied to the first manifold 251 and the second manifold 252, and the high-temperature and high-pressure gas-phase refrigerant supplied to the first manifold 251 and the second manifold 252 may pass through the first coil 241 and the second coil 242 of the indoor heat exchanger 240 via the refrigerant pipe. The refrigerant may be condensed while flowing through the first coil 241 and the second coil 242. Accordingly, the high-temperature and high-pressure gas-phase refrigerant may be phase-changed into a high-temperature and high-pressure liquid-phase refrigerant.

The high-temperature and high-pressure liquid-refrigerant supplied to the first coil 241 and the second coil 242 of the indoor heat exchanger 240 may pass through the refrigerant supply pipe 235 via the first distributor 221 and the second distributor 222 and may flow to the first expansion valve 211 and the second expansion valve 212. The refrigerant passing through the first expansion valve 211 and the second expansion valve 212 may be expanded to become a low-temperature and low-pressure two-phase refrigerant (i.e., a two-phase refrigerant).

This two-phase refrigerant may circulate through the outdoor unit 10. At this time, through the outdoor heat exchanger 120 of the outdoor unit 10, the refrigerant may become a low-temperature, low-pressure gas-phase refrigerant and flows into the compressor 100. In the case of heating full load operation of the air conditioner according to the embodiment of the present disclosure, the refrigerant supplied through the gas pipe may be connected in parallel to the indoor heat exchanger 240, thereby realizing a low-pressure loss flow path, and thus pressure loss may be minimized and the amount of power consumption of the air conditioner may be minimized.

Figure 12:
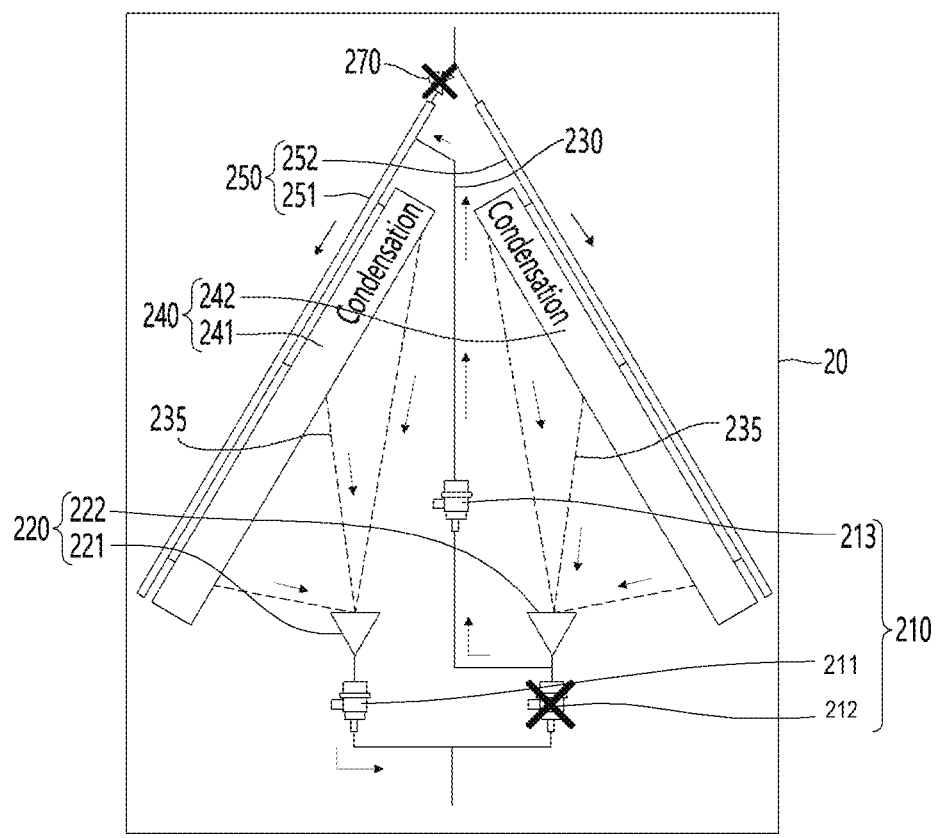
FIG. 12 is a view illustrating a refrigerant cycle during heating partial load operation of an air conditioner according to an embodiment of the present disclosure.
Figure 13:
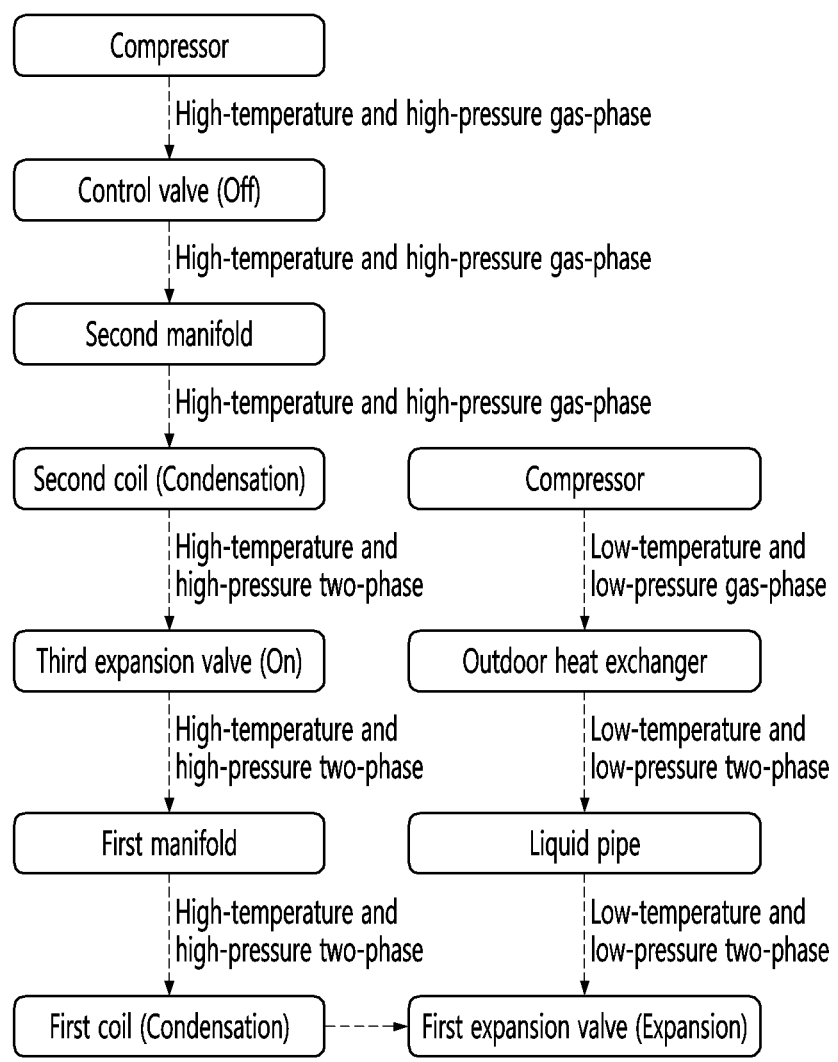
FIG. 13 is a flowchart illustrating a heating partial load operation logic of an air conditioner according to an embodiment of the present disclosure.

FIG. 12 is a view illustrating a refrigerant cycle during heating partial load operation of an air conditioner according to an embodiment of the present disclosure, and FIG. 13 is a flowchart illustrating a heating partial load operation logic of an air conditioner according to an embodiment of the present disclosure. As illustrated in FIG. 12, the refrigerant flowing therein from the outdoor unit 10 to the indoor unit 20 through the second connection pipe 172 (that is, the gas pipe) may proceed to the manifold device 250. At this time, the control valve 270 connected between the first manifold 251 and the gas pipe may perform an off operation. Accordingly, the refrigerant may proceed to the second manifold 252 of the manifold device 250.

In addition, the refrigerant may proceed from the second manifold 252 of the manifold device 250 to the second coil 242 of the indoor heat exchanger 240 and may proceed to the second distributor 222 of the distribution device 220. At this time, the second expansion valve 212 of the expansion device 210 may perform an off operation. Accordingly, the flow of refrigerant from the second expansion valve 212 to the first connection pipe 171 (that is, the liquid pipe) may be blocked. The third expansion valve 213 installed on the refrigerant flow pipe 230 connected to the gas pipe side of the first manifold 251 and the outlet side of the second expansion valve 212 may perform an on operation. Accordingly, the refrigerant may proceed from the second distributor 222 to the first manifold 251. The refrigerant at the first manifold 251 may proceed to the first coil 241 of the indoor heat exchanger 240, may pass through the first distributor 221 of the distribution device 220, and may then proceed to the first expansion valve 211 of the expansion device 210. The refrigerant proceeding to the expansion device 210 may be circulate to the outdoor unit 10 through the first connection pipe 171 (that is, the liquid pipe).

Referring to FIG. 13, the flow of refrigerant during the heating partial load operation logic of the air conditioner will be described. The high-temperature and high-pressure gas-phase refrigerant discharged from the compressor 100 of the outdoor unit 10 may pass through the gas pipe of the outdoor heat exchanger 120 and may be supplied to the indoor unit 20. The gas-phase refrigerant supplied into the indoor unit 20 through the second connection pipe 172 (that is, the gas pipe) may be blocked by the control valve 270, so the refrigerant does not flow to the first manifold 251 and does not flow to the second manifold 252.

The high-temperature and high-pressure gas-phase refrigerant flowing into the second manifold 252 may be pass through the second coil 242 of the indoor heat exchanger 240. The refrigerant may undergo a condensation process while flowing through the second coil 242. Accordingly, the high-temperature and high-pressure gas-phase refrigerant may become a high-temperature and high-pressure two-phase refrigerant.

The two-phase refrigerant may pass through the second distributor 222, and the refrigerant may flow along the refrigerant flow pipes 230 provided on the outlet side of the second expansion valve 212 and the gas pipe side of the first manifold 251. The refrigerant may flow to the third expansion valve 213 through the refrigerant flow pipe 230, and since the third expansion valve 213 is turned on, the refrigerant flowing to the first manifold 251 may pass through the first coil 241 of the indoor heat exchanger 240.

The high-temperature and high-pressure two-phase refrigerant may be condensed while flowing through the first coil 241. Accordingly, the high-temperature and high-pressure two-phase refrigerant becomes a high-temperature and high-pressure liquid-refrigerant, and the high-temperature and high-pressure liquid-refrigerant becomes a low-temperature and low-pressure two-phase refrigerant by expanding the refrigerant in the first expansion valve 211 through the first distributor 221, and the low-temperature and low-pressure two-phase refrigerant circulates to the outdoor unit 10 through the first connection pipe 171 (that is, the liquid pipe). At this time, through the outdoor heat exchanger 120 of the outdoor unit 10, the refrigerant may be phase-changed into a low-temperature and low-pressure gas-phase refrigerant and may flow into the compressor 100.

In the case of heating partial load operation of the air conditioner according to an embodiment of the present disclosure, since the refrigerant path is arranged in series from the second connection pipe 172 (that is, the gas pipe) to the first expansion valve 211, the length of the refrigerant path may be relatively longer than in the case of heating full load operation. Accordingly, since the flow rate of the refrigerant may increase and the heat transfer coefficient may increase, energy efficiency can be maximized under a heating condition with a small load.

In addition, in the heating operation of the air conditioner, when the indoor temperature reaches the set temperature or the load of the compressor 100 may be reduced to be switched to the partial load operation, the circulation amount of the refrigerant may be reduced, thereby minimizing power consumption.

Therefore, an aspect of the present disclosure is to provide an air conditioner which is capable of maximizing energy efficiency depending on the operation load by implementing an indoor heat exchanger capable of selectively providing parallel or serial operation according to full load and partial load cycles during cooling and heating operation, and a method for controlling the same. Another aspect of the present disclosure is to provide an air conditioner capable of securing pleasant air and reducing energy loss due to the use of a heater for reheating during dehumidification operation by implementing a constant temperature dehumidification cycle through an indoor heat exchanger capable of parallel or serial operation, and a method for controlling the same. Another aspect of the present disclosure is to provide an air conditioner capable of securing a sufficient amount of heat for reheating without a heater for reheating by raising the indoor temperature using the refrigerant condensed in the indoor heat exchanger during dehumidification operation, and a method for controlling the same.

In order to achieve the above aspect, the present disclosure provides an air conditioner comprising an outdoor unit including a compressor and an outdoor heat exchanger, and an indoor unit connected to the outdoor unit through a gas pipe and a liquid pipe and having an indoor heat exchanger including a first coil and a second coil which are branched from the gas pipe and connected in parallel. In such an air conditioner, the indoor unit may arrange indoor heat exchangers in a parallel or serial refrigerant flow structure to maximize energy efficiency according to an operation load, and implement a constant temperature dehumidification cycle through an indoor heat exchanger capable of parallel or serial operation.

In addition, the indoor unit may include a first manifold and a second manifold connected by refrigerant pipes to enable refrigerant flow to the indoor heat exchanger, a first expansion valve and a second expansion valve connected in parallel to the liquid pipe and blocks the flow of refrigerant or expands the refrigerant to reduce a pressure thereof, refrigerant flow pipes connecting a gas pipe side of the first manifold and an outlet side of the second expansion valve, a third expansion valve installed on the refrigerant flow pipe to block the flow of the refrigerant or expand the refrigerant to reduce a pressure thereof, and a control valve installed on the gas pipe to block the flow of refrigerant. According to the indoor heat exchanger in the present disclosure, the first coil and the second coil are formed to face each other, and the lower portions thereof have a wider separation width and the upper portions thereof have a relatively narrower separation width than the lower portions, and thus the first coil and the second coil are formed to be inclined, respectively.

In addition, according to the indoor heat exchanger according to the present disclosure, the first manifold and the second manifold may be disposed side by side with the first coil and the second coil and may communicate with each other through a refrigerant pipe. According to the present disclosure, the refrigerant flowing from the first distributor and the second distributor to the first coil and the second coil of the indoor heat exchanger may flow through a plurality of refrigerant supply pipes. According to the present disclosure, during the cooling and dehumidification operation of the air conditioner, the refrigerant flowing therein from the outdoor unit through the liquid pipe may pass through the indoor heat exchanger and be circulated to the gas pipe. According to the present disclosure, during the heating operation of the air conditioner, the refrigerant flowing therein from the outdoor unit through the gas pipe may pass through the indoor heat exchanger and circulate to the liquid pipe.

According to the present disclosure, the third expansion valve may block the flow of refrigerant when the air conditioner is operated under full load or high load under cooling, dehumidification, and heating conditions. According to the present disclosure, the second expansion valve and the control valve may block the flow of refrigerant during partial load or low load operation of the air conditioner under cooling, dehumidification, and heating conditions.

According to the present disclosure, the refrigerant supply pipes of the first coil and the second coil of the indoor heat exchanger may be switched to parallel flow paths during full load or high load operation under cooling, dehumidification, and heating conditions. According to the present disclosure, refrigerant supply pipes of the first coil and the second coil of the indoor heat exchanger may be switched to serial flow paths during partial load or low load operation under cooling, dehumidification, and heating conditions.

According to the present disclosure, the first coil and the second coil may operate as evaporators during cooling and high load dehumidification operations of the air conditioner. According to the present disclosure, the first coil may operate as a condenser and the second coil may operate as an evaporator during the low-load dehumidification operation of the air conditioner. According to the present disclosure, during the heating operation of the air conditioner, the first coil and the second coil may operate as condensers.

According to the present disclosure, a method for controlling an air conditioner is provided and the method includes, during cooling full load operation and high load dehumidification operation, phase-changing a high-temperature and high-pressure gas-phase refrigerant compressed by a compressor of an outdoor unit into a medium-temperature and high-pressure liquid-refrigerant in an outdoor heat exchanger and then flowing to a first expansion valve and a second expansion valve of an indoor unit; expanding the refrigerant passing through the first expansion valve and the second expansion valve to phase-change into a low-temperature, low-pressure two-phase refrigerant, and then flowing to the first coil and the second coil through a refrigerant pipe; evaporating the refrigerant flowing through the first coil and the second coil to phase-change into a low-temperature, low-pressure gas-phase refrigerant, and then flowing into a first manifold and a second manifold through refrigerant pipes; and circulating the refrigerant flowing through the first manifold and the second manifold to the compressor of the outdoor unit.

According to the present disclosure, a method for controlling an air conditioner is provided and the method includes during cooling partial load operation and low-load dehumidification operation, phase-changing a high-temperature and high-pressure gas-phase refrigerant compressed by a compressor of an outdoor unit into a medium-temperature and high-pressure liquid-refrigerant in the outdoor heat exchanger, and then blocking by a second expansion valve of an indoor unit and simultaneously flowing into the expansion valve; flowing the refrigerant passing through the first expansion valve to a first coil through a refrigerant pipe; flowing the refrigerant flowing to the first coil to a first manifold through a refrigerant pipe; flowing the refrigerant passing through the first manifold to a second manifold through a third expansion valve on a refrigerant flow pipe; and circulating the refrigerant passing through the second manifold to the compressor of the outdoor unit.

According to the present disclosure, during the cooling part-load operation, the refrigerant passing through the first expansion valve expands to phase-change into a low-temperature, low-pressure two-phase refrigerant, and the refrigerant flowing into the first coil is evaporated; and during the low-load dehumidification operation, the refrigerant flowing to the first coil is condensed.

According to the present disclosure, a method for controlling an air conditioner is provided and the method includes, during a heating full load operation, passing a high-temperature and high-pressure gas-phase refrigerant compressed by a compressor of an outdoor unit through the gas pipe to flow into an indoor unit; flowing the high-temperature and high-pressure gas-phase refrigerant supplied to the indoor unit to a first manifold and a second manifold; flowing the refrigerant flowing to the first manifold and the second manifold to a first coil and a second coil through a refrigerant pipe; condensing the refrigerant flowing to the first coil and the second coil to phase-change into a high-temperature and high-pressure liquid-refrigerant, and then flowing to a first expansion valve and a second expansion valve; and expanding the refrigerant flowing through the first expansion valve and the second expansion valve to phase-change into a low-temperature, low-pressure, two-phase refrigerant, and then phase-changing into a low-temperature, low-pressure, gas-phase refrigerant in an outdoor heat exchanger of the outdoor unit to circulate to the compressor of the outdoor unit.

According to the present disclosure, a method for controlling an air conditioner is provided and the method includes, during heating partial load operation, passing a high-temperature and high-pressure gas-phase refrigerant compressed by a compressor of an outdoor unit through a gas pipe to flow into an indoor unit; blocking the high-temperature and high-pressure gas-phase refrigerant supplied to the indoor unit at a first manifold and simultaneously flowing to a second manifold; flowing the refrigerant flowing into the second manifold into a second coil; condensing the refrigerant flowing into the second coil to phase-change into a high-temperature and high-pressure two-phase refrigerant, and then flowing into the first manifold through a third expansion valve on a refrigerant flow pipe; condensing the refrigerant flowing through the first manifold to a first coil to phase-change into a high-temperature and high-pressure liquid-refrigerant; expanding the refrigerant flowing into the first coil in a first expansion valve to phase-change into a low-temperature and low-pressure two-phase refrigerant; and phase-changing a low-temperature and low-pressure gas-phase refrigerant in an outdoor heat exchanger of the outdoor unit and then circulating to the compressor of the outdoor unit.

According to the air conditioner and the method for controlling the same according to the present disclosure configured as described above, it is possible to maximize energy efficiency depending on the operation load by improving not only full load performance but also partial load performance during cooling and heating operation of the air conditioner, and in particular, the present disclosure has the effect of meeting the North American SEER and HSPF annual efficiency standards. In addition, by implementing a constant-temperature dehumidification cycle through an indoor heat exchanger capable of parallel or serial operation, it is possible to secure pleasant air and reduce energy loss due to the use of a heater for reheating during dehumidification operation.

The above description of the present disclosure is for illustrative purposes, and those skilled in the art can understand that it can be easily modified into other specific forms without changing the technical spirit or essential features of the present disclosure. Therefore, the embodiments described above should be understood as illustrative in all respects and not limiting. The scope of the present disclosure is indicated by the following claims, and all changes or modifications derived from the meaning and scope of the claims and equivalent concepts should be interpreted as being included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   an outdoor unit including a compressor and an outdoor heat exchanger; and
   an indoor unit connected to the outdoor unit by a first connection pipe and a second connection pipe,
   wherein the indoor unit includes:
     an indoor heat exchanger including a first coil and a second coil which are branched from the second connection pipe and connected in parallel;
     a first manifold and a second manifold fluidly connected to the indoor heat exchanger;
     a first expansion valve and a second expansion valve connected in parallel to the first connection pipe;
     a refrigerant flow pipe connected to a side of the first manifold fluidly coupled to the second connection pipe and an outlet side of the second expansion valve;
     a third expansion valve installed on the refrigerant flow pipe; and
     a control valve installed on the second connection pipe.

2. The air conditioner of claim 1,
   wherein the first coil and the second coil are positioned to face each other, and
   wherein upper portions thereof have a relatively narrower separation width than lower portions thereof such that the first coil and the second coil are inclined.

3. The air conditioner of claim 2, wherein the first manifold and the second manifold are positioned adjacent to and fluidly communicate with the first coil and the second coil, respectively.

4. The air conditioner of claim 1, further comprising:
   a first distributor and a second distributor connected in series to the first expansion valve and the second expansion valve, respectively, and connected to the first coil and the second coil, respectively.

5. The air conditioner of claim 4, wherein refrigerant flows from the first distributor and the second distributor to the first coil and the second coil of the indoor heat exchanger through a plurality of refrigerant supply pipes.

6. The air conditioner of claim 5, further comprising a flow control valve configured to direct refrigerant flowing into the indoor unit from the outdoor unit through one of the first connection pipe or the second connection pipe,
   wherein, when the flow control valve directs refrigerant to flow into the indoor unit from the outdoor unit through the first connection pipe, the refrigerant passes through the indoor heat exchanger and circulates back to the outdoor unit through the second connection pipe during cooling and or dehumidification operations of the air conditioner.

7. The air conditioner of claim 6, wherein, when the flow control valve directs refrigerant to flow from the outdoor unit through the second connection pipe, the refrigerant passes through the indoor heat exchanger and circulates back to the outdoor unit through the first connection pipe during a heating operation of the air conditioner.

8. The air conditioner of claim 7, wherein opening the first expansion valve, the second expansion valve, and the control valve while the third expansion valve is closed blocks a flow of refrigerant during a full load or a high load operation under the cooling, the dehumidification, and the heating operations of the air conditioner.

9. The air conditioner of claim 8, wherein, when the first expansion valve, the second expansion valve, and the control valve are opened while the third expansion valve are closed, the refrigerant supply pipes of the first coil and the second coil of the indoor heat exchanger are switched to parallel flow paths during the full load or high load operation under the cooling, the dehumidification, and the heating operations of the air conditioner.

10. The air conditioner of claim 8, wherein, when the flow control valve guides refrigerant to flow into the indoor unit from the outdoor unit through the first connection pipe, the first coil and the second coil operate as evaporators during the full load or a partial load operation under the cooling operation of the air conditioner, and during the high load operation under the dehumidification operation of the air conditioner.

11. The air conditioner of claim 7, wherein opening the first expansion valve and the third expansion valve while the second expansion valve and the control valve are closed blocks a flow of refrigerant during a partial load or a low load operation under the cooling, the dehumidification, and the heating operations of the air conditioner.

12. The air conditioner of claim 11, wherein, when the first expansion valve and the third expansion valve are opened while the second expansion valve and the control valve is closed, the refrigerant supply pipes of the first coil and the second coil of the indoor heat exchanger are switched to serial flow paths during the partial load or the low load operation under the cooling, the dehumidification, and the heating operations of the air conditioner.

13. The air conditioner of claim 11, wherein, when the first expansion valve and the third expansion valve are opened while the second expansion valve and the control valve are closed, the first coil operates as a condenser and the second coil operates as an evaporator during the low load operation under the dehumidification operation of the air conditioner.

14. The air conditioner of claim 7, wherein, when the flow control valve directs refrigerant to flow into the indoor unit from the outdoor unit through the second connection pipe, the first coil and the second coil operate as condensers during the full load and the partial load operation under the heating operation of the air conditioner.

15. The air conditioner of claim 1, wherein the first connection pipe is a liquid pipe for carrying a liquid-phase refrigerant, and the second connection pipe is a gas pipe for carrying a gaseous-phase refrigerant.

16. A method for controlling an air conditioner during a full load cooling operation or during a high load dehumidification operation, the method comprising:
    phase-changing a high-temperature and high-pressure gas-phase refrigerant compressed by a compressor of an outdoor unit into a medium-temperature and high-pressure liquid-phase refrigerant in an outdoor heat exchanger and then guiding the phase-changed refrigerant to a first expansion valve and a second expansion valve of an indoor unit;

expanding refrigerant passing through the first expansion valve and the second expansion valve to phase-change into a low-temperature, low-pressure two-phase refrigerant, and then guiding the expanded refrigerant to a first coil and a second coil through refrigerant pipes;

evaporating refrigerant flowing through the first coil and the second coil to phase-change into a low-temperature, low-pressure gas-phase refrigerant, and then-directing guiding the evaporated refrigerant into a first manifold and a second manifold through refrigerant pipes; and circulating the refrigerant flowing through the first manifold and the second manifold back to the compressor of the outdoor unit.

17. A method for controlling an air conditioner during a partial load cooling operation or a low-load dehumidification operation, the method comprising:

phase-changing a high-temperature and high-pressure gas-phase refrigerant compressed by a compressor of an outdoor unit into a medium-temperature and high-pressure liquid-phase refrigerant in an outdoor heat exchanger, and then blocking a flow of the phase-changed refrigerant by a second expansion valve of an indoor unit while the phase-changed refrigerant flows into a first expansion valve of the indoor unit;

guiding the phase-changed refrigerant passing from the first expansion valve to a first coil;

guiding refrigerant flowing to the first coil to a first manifold;

guiding refrigerant passing through the first manifold to a second manifold through a path that includes a third expansion valve on a refrigerant flow pipe; and circulating refrigerant passing through the second manifold back to the compressor of the outdoor unit.

18. The method for controlling an air conditioner of claim 17, wherein, during the part-load cooling operation, the refrigerant passing through the first expansion valve expands to phase-change into a low-temperature, low-pressure two-phase refrigerant, and the refrigerant flowing into the first coil is evaporated; and wherein, during the low-load dehumidification operation, the refrigerant flowing to the first coil is condensed.

19. A method for controlling an air conditioner during a partial load heating operation, the method comprising:

passing a high-temperature and high-pressure gas-phase refrigerant compressed by a compressor of an outdoor unit through a gas pipe to flow into an indoor unit;

blocking the high-temperature and high-pressure gas-phase refrigerant supplied to the indoor unit at a first manifold and simultaneously flowing the gas-phase refrigerant to a second manifold;

guiding refrigerant flowing from the second manifold to a second coil;

condensing refrigerant flowing into the second coil to phase-change into a high-temperature and high-pressure two-phase refrigerant, and then guiding the high-temperature and high-pressure two-phase refrigerant into the first manifold through a third expansion valve on a refrigerant flow pipe;

condensing the refrigerant flowing through the first manifold to a first coil to phase-change into a high-temperature and high-pressure liquid-refrigerant;

expanding the refrigerant flowing into the first coil in a first expansion valve to phase-change into a low-temperature and low-pressure two-phase refrigerant; and phase-changing the low-temperature and low-pressure gas-phase refrigerant in an outdoor heat exchanger of the outdoor unit and then circulating the phase-changed refrigerant back to the compressor of the outdoor unit.

\* \* \* \* \*